(12) United States Patent
Ortelt et al.

(10) Patent No.: US 7,205,044 B2
(45) Date of Patent: Apr. 17, 2007

(54) PLASTIC PART AND METHOD FOR PRODUCING THE PLASTIC PART AND USE OF THE PLASTIC PART

(75) Inventors: Marc Ortelt, Braunschweig (DE); Holger Derzapf, Jembke (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 423 days.

(21) Appl. No.: 10/308,521

(22) Filed: Dec. 3, 2002

(65) Prior Publication Data

US 2003/0108732 A1    Jun. 12, 2003

(30) Foreign Application Priority Data

Dec. 5, 2001    (DE) ................. 101 59 618

(51) Int. Cl.
*B32B 3/26*    (2006.01)
*B60R 21/20*    (2006.01)

(52) U.S. Cl. .............. 428/316.6; 428/318.6; 428/319.3; 428/319.7; 428/71; 428/131; 280/728.3; 280/730.1; 280/730.2; 280/732

(58) Field of Classification Search ............ 428/304.4, 428/131; 280/728.3, 728.2, 732, 730.1, 730.2
See application file for complete search history.

(56) References Cited

U.S. PATENT DOCUMENTS 3,677,601 A * 7/1972 Morrison et al. ...... 297/440.11
6,299,197 B1 * 10/2001 Mueller ................. 280/728.3
6,435,554 B1 * 8/2002 Feldman ................ 280/743.2
6,454,300 B1 * 9/2002 Dunkle et al. ............. 280/742
6,523,854 B1 * 2/2003 Muller ................... 280/728.3
6,581,959 B2 * 6/2003 Muller ................... 280/728.3

FOREIGN PATENT DOCUMENTS

| DE | 37 40 678 A1 | 6/1989 |
| DE | 197 26 878 A1 | 10/1998 |
| DE | 19860840 A1 * | 9/1999 |
| DE | 100 01 246 A1 | 7/2001 |
| WO | WO 9961288 A1 * | 12/1999 |

* cited by examiner

*Primary Examiner*—Hai Vo
(74) *Attorney, Agent, or Firm*—Norris McLaughlin & Marcus, PA

(57) ABSTRACT

The invention relates to a plastic part (10), in particular for an interior lining of an automobile, with a support (16) and at least one layer (14) foamed onto the support (16) and a slush skin (24), wherein the foamed layer (14) comprises at least partially an integrated fabric (22) and the fabric (22) is guided through at least one slit (18) of the support (16) to a side of the support (16) facing away from the foamed layer (14), and to a method for producing the plastic part and the use of the plastic part.

Figure 3:
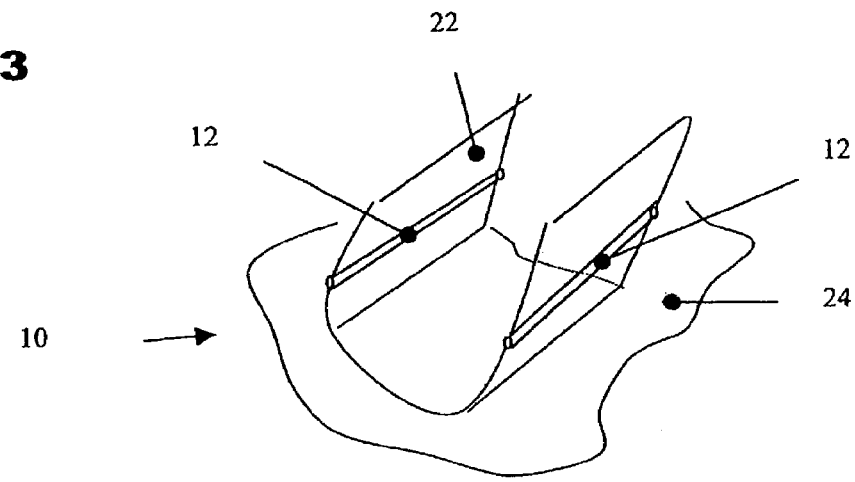

The fabric (22) includes a sealing device (12) for sealing the at least one slit (18).

11 Claims, 1 Drawing Sheet

| 2A | 2B | 2C | 2D |

PLASTIC PART AND METHOD FOR PRODUCING THE PLASTIC PART AND USE OF THE PLASTIC PART

The invention relates to a plastic part and a method for producing the plastic part with the features recited in the preamble of claims 1 and 10, as well as to the use of the plastic part.

It is known to manufacture plastic parts for interior linings of automobiles with an integrated airbag cover, wherein the airbag cover has a tearable region in the form of a flap functioning as an exit opening for the airbag. The plastic parts consist of an outer skin, a support and an intermediate layer, in particular made of a foam material, wherein the outer skin has a tearable seam and the like that is formed by weakening the material. The flap-like, tearable region is typically partially milled in the support after the plastic part has been formed, and the intermediate layer, which in most cases is a foam layer, is weakened by a process that is similar to the process used to weaken the outer skin.

These aforedescribed conventional plastic parts for airbag covers, which are described, for example, in DE 100 01 246, are used with those airbag systems (airbag module and airbag cover) where an airbag flap disposed in the support of the plastic part opens in the same direction as a gas sack of the airbag system, for example towards the driver or a passenger in the rear seat of an automobile.

When such airbag modules are activated, the opening airbag (gas sack) of the airbag cover disadvantageously bursts open inwardly into the passenger compartment. This can cause injuries to the occupants, in particular when the occupants sit in close proximity to the airbag cover.

To prevent such injuries, DE 197 26 878 describes an airbag cover, wherein the airbag cover is integrated in a plastic part and can move upwardly, downwardly or sideways, with the airbag module being located behind the plastic part. This prevents the airbag cover from moving towards the driver or the passenger. When such airbag covers are manufactured, a separation layer and a sealing layer have to be provided between the dashboards unit (support) and the airbag flap disposed in the support. The separation layer can advantageously be made of a plastic foil.

In addition to the aforementioned plastic foils, other sealing systems with a separation layer can be used to prevent leaks, such as inserted tearable sealing strips or so-called film bridges.

In another prior art embodiment, plastic parts are produced with an integrated airbag cover, wherein a support and preformed surface layers, in particular slush skins, are connected with each other in separate foaming tools by forming a foam layer (back-foaming). During this fabrication process, cover flaps also likewise formed in the support parts of the plastic part. A fabric is inserted under the slush skin when the back-foaming process step is performed, so that the cover flaps can be sealed and later separated from the support. The fabric is pulled through existing slits disposed in the support to a side of the support of the subsequent airbag cover that faces away from the foam layer.

This fabric takes on two essential functions. Firstly, the fabric seals the slits against the support parts during back-foaming, thereby preventing particles to enter the region of the support near the rear wall. The fabric also provides a reinforcement and takes on a sealing function which essentially corresponds to the sealing features described above in conjunction with the conventional sealing embodiments.

Secondly, the edges of the fabric are used to tear the combined (airbag cover) slush skin (outer skin), the foam layer and the cover flaps from the support, when the airbag module is activated, which prevents the airbag cover from moving in the direction of the driver or passenger. Removing the airbag cover unblocks the path for the gas sack of the airbag module.

However, the fabric which is guided into the foaming mold and through the slits does disadvantageously does not remain completely sealed in the support when the slush skin is back-foamed in the region of the slits, leading to the formation of particles in the support region near the rear wall. These particles can cause undesirable airborne particles when the airbag is subsequently released.

The particles must therefore be manually removed when the complete airbag system, consisting of airbag module and airbag cover, is installed and manufactured.

Disadvantageously, previous solutions that use sliders or inflatable or rigid seals for sealing, are technically quite complex.

It is therefore an object of the invention to provide a sealing device which can be used to seal a slotted support during the foaming operation of a plastic part, in particular an airbag cover with an integrated cover flap for releasing an airbag, so that foam particles cannot enter the region of support near the rear wall and no airborne particles are produced when the airbag is released.

The object is solved by a plastic part having the characteristic features recited in claim 1. A slit can be sealed completely and durably by providing a fabric that is at least partially integrated with a foamed layer, and guiding the fabric disposed on a support and at least one layer foamed on the support and a connected slush skin through the at least one slit of the support to a side of the support facing away from the foamed layer, wherein the fabric includes a sealing device for sealing the at least one slit.

Moreover, plastic parts having the features recited in claim 1 are obtained with the inventive method having the features recited in claim 10.

According to the invention, the plastic part has sealing devices disposed on the fabric wherein the sealing devices can, in particular, be foamed, sprayed or glued.

In addition, the sealing devices of the invention have sealing edges which have, in particular, a circular, triangular, oval or rectangular shape, in cross-section.

The object is also solved by a method, wherein sealing devices are foamed, sprayed or glued to the fabric before the fabric is inserted in a foaming device.

In this way, the fabric which is required pull the airbag cover out, can conveniently and advantageously be provided with a sealing device in the slit of the support.

Additional features of preferred embodiments of the invention are recited in the dependent claims.

Figure 1:
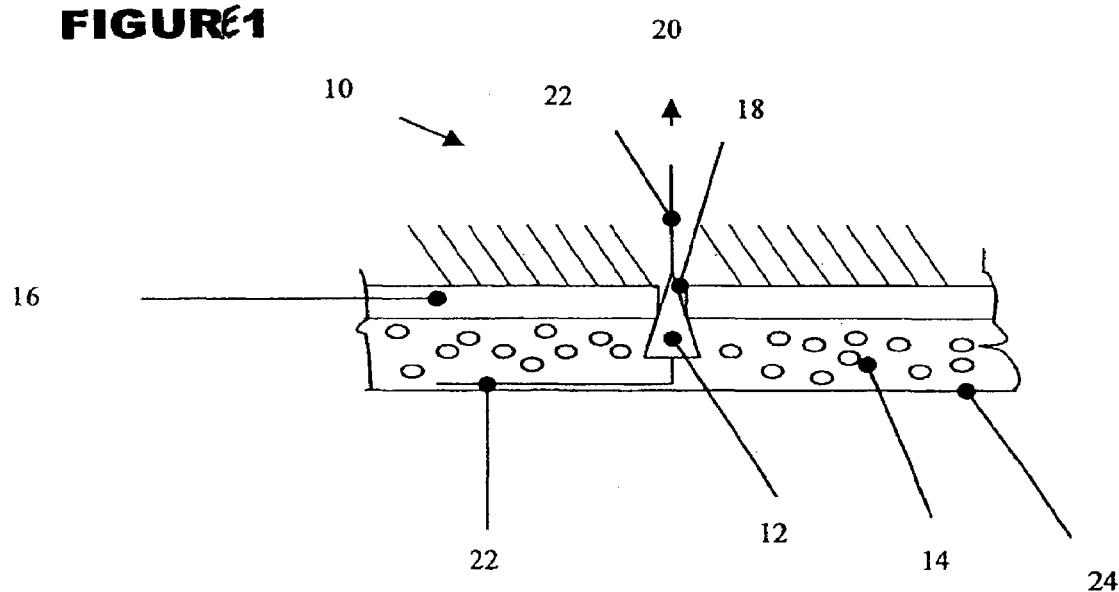

Exemplary embodiments of the invention will be described hereinafter in detail in conjunction with the drawings. It is shown in:

FIG. 1 a cross-section through a plastic part in the region of a slit;

FIGS. 2A to 2D each showing cross-sectional views of sealing devices on the fabric; and FIG. 3 a schematic diagram of a fabric with a sealing device on a slush skin (support omitted).

Figure 2:
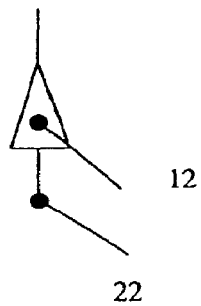
Figure 2:
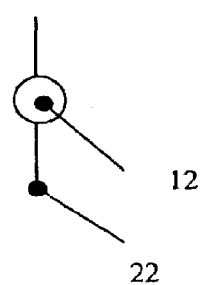
Figure 2:
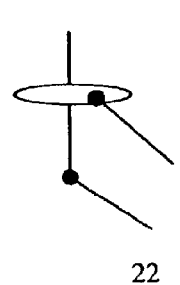
Figure 2:
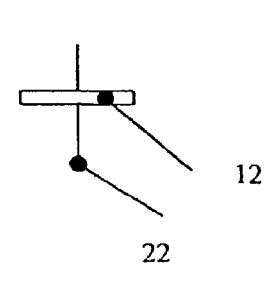

FIG. 1 shows schematically the construction of a plastic part 10. The plastic part 10 consists of an upper visible layer, in particular a slush skin 24, a foam layer 14 and a support 16. At least one slit 18 is disposed in the support 16. The foam layer 14 includes a fabric 22, with a sealing device 12 being attached to at least at an end portion of the fabric 22. The fabric ends are pulled by a tensile force 20 through the slit 18 towards the support 16. The sealing device 12 is either foamed, sprayed or glued. Other attachment methods can also be employed. The support 16 forms a sealing seat by way of the slit 18. The sealing devices 12, which are illustrated in FIG. 2 together with the fabric 22, have shapes that are either triangular (FIG. 2A), circular (FIG. 2B), oval (FIG. 2C) or rectangular (FIG. 2D), Other shapes are also feasible. The employed shapes of the sealing devices depend basically on the shape of the slit 18. The sealing device 12 forms a sealing edge which completely seals the existing sealing seat of the slit 18.

FIG. 3 shows schematically—for sake of clarity only partially—an exemplary embodiment of the layer structure of the plastic part 10 with the fabric 22 having two sealing devices 12 which are inserted in the slits 18 (not shown). The fabric 22 is integrated in the slush skin 24. The slush skin 24 with the support 16 (not shown in FIG. 3) and the fabric 22 with the sealing devices 12 together with the foam layer 14 (not shown in FIG. 3) form the plastic part 10.

The operation and significance of the inserted fabric for an airbag cover becomes clear when one assumes that a tensile force 20 is applied to the ends of the fabric 22 guided out of the support 16. When a force 20 is applied on at least one side, the fabric tears the airbag fabric together with the foam layer 14, which is in addition weakened in the region of the airbag flap, and the slush skin 24 from the plastic part, thereby unblocking an opening for a gas sack of an airbag module.

The method for producing the plastic part will be described hereinafter with reference to FIG. 1.

The slush skin 24 is inserted in a bottom section of a tool of a foaming device. In parallel, a sealing device 12 is applied to a fabric 22. In particular, the sealing device 12 is glued, foamed or sprayed. The fabric 22 together with the sealing device 12 is inserted in the bottom section of the tool before the foam is introduced into the bottom section of the tool. An upper section of the tool advances a support 16 with the at least one slit 18, and a tensile force 20 is applied to the fabric 22 through the slit 18 in the region near the rear wall of the support 16, forcing the sealing device 12 into precise contact with the slit 18. The sealing device 12 is dimensioned so that the slit 18 is completely sealed. Subsequently, the upper and the lower section of tool are spaced apart by a distance determined by the process, and the foaming process is carried out. The foaming process connects the slush skin 24 with the support 16 and embeds the fabric 22 in the foamed layer 14, whereby the sealing device 12 completely seals the slit 18.

Plastic parts 10 with the aforedescribed properties and produced according to the aforedescribed methods, are used for trim parts or instrument support in the interior space of automobiles, in particular of airbag covers, panel mounts, dashboards, instrument panels, side panels, door panels, headliners, interior rear wall parts with hat racks, and other interior lining parts or items for automobiles.

LIST OF REFERENCE NUMERALS 10 plastic part
12 sealing device
14 foam layer
16 support
18 slit
20 tensile force
22 fabric
24 slush skin

The invention claimed is:

1. A plastic part for an interior lining for an automobile, comprising
   a support,
   at least one foam layer, and
   a slush skin,
   wherein the foam layer comprises at least partially an integrated fabric sheet and
   wherein the fabric sheet passes through at least one slit of the support to a side of the support facing away from the foamed layer,
   the fabric sheet including a sealing device disposed wherein a portion of the sealing device projects from a surface of the foam layer for sealing the at least one slit for sealing the at least one slit.

2. The plastic part according to claim 1, wherein the sealing device is foamed onto the fabric sheet.

3. The plastic part according to claim 1, wherein the sealing device is sprayed onto the fabric sheet.

4. The plastic pert according to claim 1, wherein the sealing device is glued to the fabric sheet.

5. The plastic part according to claim 1, wherein the sealing device has a shape capable of sealing a sealing seat of the slit of the support via sealing surfaces provided on the sealing device.

6. The plastic part according to claim 5, wherein the sealing device is circular in cross-section.

7. The plastic part according to claim 5, wherein the sealing device is triangular in cross-section.

8. The plastic part according to claim 5, wherein the sealing device is oval in cross-section.

9. The plastic part according to claim 5, wherein the sealing device is rectangular in cross-section.

10. The plastic part according to claim 5, wherein the sealing device is elongate and the sealing surfaces are provided along the longitudinal surface of the sealing device.

11. A combination of a plastic part according to claim 1 and an interior lining structure of an automobile.

* * * * *

UNITED STATES PATENT AND TRADEMARK OFFICE
CERTIFICATE OF CORRECTION

| | |
|---|---|
| PATENT NO. | : 7,205,044 B2 |
| APPLICATION NO. | : 10/308521 |
| DATED | : April 17, 2007 |
| INVENTOR(S) | : Ortelt et al. |

It is certified that error appears in the above-identified patent and that said Letters Patent is hereby corrected as shown below:

Column 3, Line 9, "or rectangular (FIG. 2D), Other" should read -- or rectangular (FIG. 2D). Other --

Column 4, Lines 27-28, "for sealing the at least one slit for sealing the at least one slit" should read -- for sealing the at least one slit --

Column 4, Line 33, "The plastic pert" should read -- The plastic part --

Signed and Sealed this

Eighteenth Day of March, 2008

JON W. DUDAS
*Director of the United States Patent and Trademark Office*